United States Patent

[11] 3,615,884

[72] Inventor James D. Collins
       Indianapolis, Ind.
[21] Appl. No. 5,602
[22] Filed Jan. 26, 1970
[45] Patented Oct. 26, 1971
[73] Assignee General Motors Corporation
       Detroit, Mich.

[54] METHOD OF INCREASING THE LIFE OF CARBIDE CUTTING TOOLS
3 Claims, 3 Drawing Figs.
[52] U.S. Cl. .................................................. 148/6.3,
       29/182.7, 29/182.8, 51/309, 148/126
[51] Int. Cl. .................................................. C23f 7/08
[50] Field of Search .................................. 148/6, 6.3,
       6.35, 126; 29/182.7, 182.3, 182.8, 95; 51/309;
       75/203, 204; 76/101

[56] References Cited
UNITED STATES PATENTS
3,249,407   5/1966   Alexander et al. .............   29/182.7
3,369,892   2/1968   Ellis et al. .....................   148/126
FOREIGN PATENTS
951,590   10/1956   Germany .....................   148/6.3

Primary Examiner—Ralph S. Kendall
Attorneys—Sidney Carter and Peter P. Kozak

ABSTRACT: A method of increasing the life and cutting characteristics of a carbide cutting tool is disclosed wherein the tool is heated in the range of 750° to 1600° F. in an oxidizing environment for a time sufficient to produce an oxide layer on the tool having a thickness of at least 0.0002 inch. The oxide layer prevents instantaneous edge buildup resulting in improved tool life at speed and feed ranges at which built-up edge is the failure mode.

METHOD OF INCREASING THE LIFE OF CARBIDE CUTTING TOOLS

This invention relates to a method of increasing the machining life and improving the cutting characteristics of a carbide cutting tool and, more particularly, to an oxidation surface treatment of a carbide cutting tool in order to increase the resistance of the tool to instantaneous chip welding at the start of a machining operation. As used herein a carbide cutting tool refers to tungsten, tantalum, columbium, or titanium carbides or mixtures thereof dispersed and held in a cobalt binder.

The life of a cutting tool is directly related to the physical requirements of removing chips from material having a specific resistance against the separation and deformation of the chips. The energy required to machine a workpiece is almost completely transformed into cutting heat, deformation heat, and frictional heat with the latter being only about 5 percent of the total heat generated. Factors influencing cutting temperatures are: cutting speed, cutting feed and depth of cutting. In addition, the physical properties of the material being machined such as yield strength, coefficient of friction, thermal capacity, thermal conductivity, and grain size also have a pronounced effect on the amount of heat generated at the chip-tool interface. Since for a given material the temperature generated at the chip-tool interface is a function of the cutting speed and the pressure at the interface, several different wear mechanisms occur with changes in these parameters. With increasing cutting speed and pressure, the wear mechanisms change from chip welding, to pure flank wear, to oxidation and cratering and, finally, to plastic deformation of the cutting tool nose.

A major cause of carbide cutting edge breakdown in many commercial applications is edge build up because many commercial applications dictate speed and feed ranges with corresponding chip-tool interface temperatures and pressures in which edge buildup is the primary mode of failure. A built-up edge or welding of the machined chip to the cutting edge of the tool occurs as a result of considerable cutting pressures and high temperatures at the chip-tool interface. This deposit increases in size until it is partly or entirely swept away by subsequently formed chips after which the built-up edge is reformed. During this cycle of formation and removal, parts of the cutting edge may be carried away causing a structural breakdown of the cutting edge. My studies tend to show that edge buildup is essentially a welding action with the welding being normally confined to the cobalt binder. In addition, the presence of a built-up edge is an imperfection at the normally sharp cutting edge of the tool and results in poor cutting characteristics and surface finishes on the machined material. My studies have shown that a built-up edge instantaneously forms when the tool contacts a moving workpiece, and as a result, a major portion of the life of a tool is dissipated the instant the tool meets the workpiece and the built-up edge forms. Therefore, it is highly desirable in order to increase the life and cutting characteristics of a carbide cutting tool, that this tendency toward instantaneous edge buildup be eliminated.

Accordingly, it is the principal object of this invention to provide a method for increasing the resistance of a carbide cutting tool to instantaneous edge buildup whereby the life and the cutting characteristics of the tool are significantly increased in certain speed and feed ranges at which built-up edge is normally the primary mode of failure.

It is a further object of my invention to provide an inexpensive surface treatment for a carbide cutting tool which substantially eliminates instantaneous built-up edge on the tool over a major portion of said speed and feed ranges.

In general, these and other objects are accomplished by heating a carbide tool between the temperatures of 750° to 1,600° F. in an oxidizing environment for a time sufficient for a layer of cobalt oxide having a thickness of 0.0002 inch to form. Temperatures below 750° F. fail to oxidize the cobalt, while temperatures above 1,600° F. cause the cobalt binder to break down thus destroying the strength of the tool. The oxide layer formed on the surface of the tool presents a diffusion barrier between the chip removed from the workpiece and the cobalt binder thus effectively preventing the chip from welding to the tool. As a result of the presence of this thin oxide layer on the surface of the tool, tool life and cutting characteristics of the tool are improved because the major cause of tool failure and poor surface finishes is eliminated.

Other objects and advantages will become apparent from the following detailed description, reference being had to the accompanying figures, of which:

Figure 1:
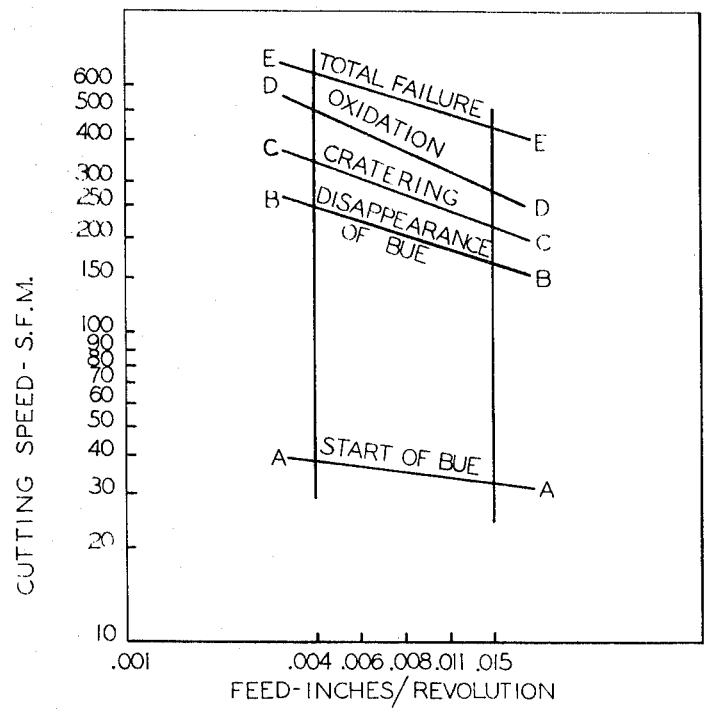
FIG. 1 is a map of the cutting characteristics of an untreated tungsten carbide cutting tool on SAE 1045 material having a hardness of 200 BHN.
Figure 2:
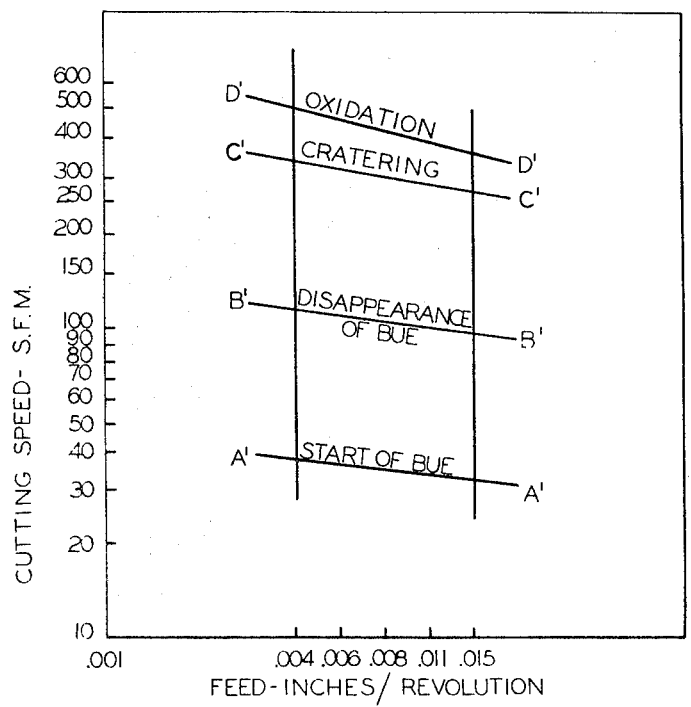
FIG. 2 is a map similar to FIG. 1 but of the cutting characteristics of a tungsten carbide cutting tool treated to provide a thin oxide layer on its surface.
Figure 3:
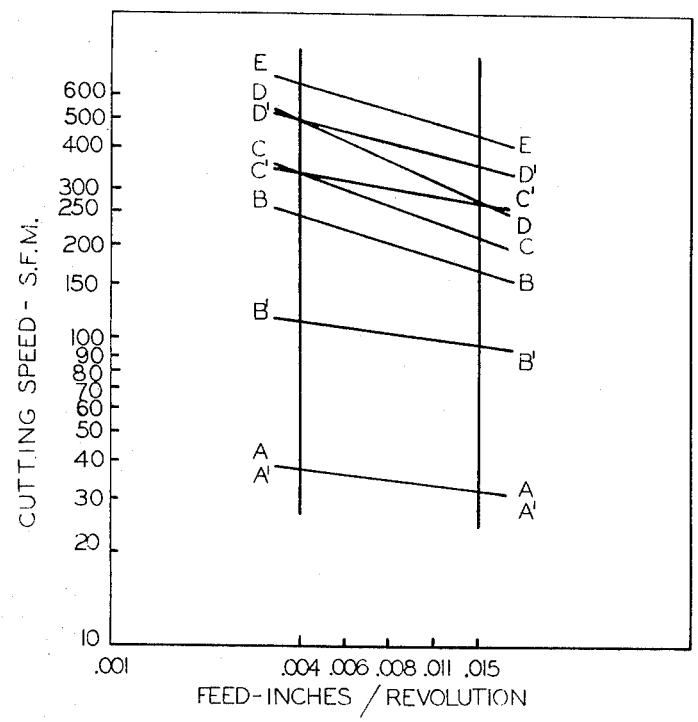
FIG. 3 is an overlay of FIGS. 1 and 2.

FIGS. 1 through 3 involve the concept of plotting regions of kinds of tool behavior in the form of a plot of speed versus feed and graphically present the behavior of a particular tool material when machining a particular work material. The various kinds of tool behavior can be isolated by regions on the map which are bound by straight lines when the data is plotted on log-log scales.

Referring to FIG. 1, at low speeds (below line A—A) there is a region where no built-up edge is discernible due to the relatively low temperatures and pressures involved. In this region there is insignificant tool wear and long tool life and good surface finishes are obtained. However, due to the low speeds involved, it is rarely practical to machine in this region. If the speed and, consequently, the interface temperature and pressure are increased, a broad region between line A—A and line B—B of built-up edge is encountered. In this region tool life and surface finish are poor due to the presence of a built-up edge. The usual means of eliminating the built-up edge condition is to increase cutting speeds since at higher speeds, this built-up edge disappears. Therefore, the ideal machining range lies above line B—B and below line C—C where friction induced cratering becomes the predominant mode of cutting edge deterioration. However, this region is relatively narrow, and it may not always be possible or practical to machine in this region since speeds and feeds may be limited by such factors as the mass or shape of the workpiece, the condition of the tools, and machining characteristics of the material. At still higher speeds where the interface temperature is greatly increased, oxidation of the tool material is the failure mode. At still higher speeds, essentially instantaneous tool failure due to plastic deformation occurs. In machining a wide variety of steels, speed and feed ranges are frequently limited to the area between lines A—A and B—B because of the limitations previously mentioned and, therefore, built-up edge and accompanying crater wear are the limiting factors on tool life.

The applicability of this invention is directed to machining operations wherein speeds and feeds are limited to the intermediate or built-up edge region between lines A—A and B—B as shown on FIG. 1; and includes machining operations involving steels and other materials such as titanium, which is notorious for producing built-up edge. As may be seen on FIG. 1, the built-up edge region is broad encompassing speeds between about 40 and 250 surface feet per minute at feeds of 0.004 inches per revolution and between about 30 and 175 surface feet per minute at feeds of 0.015 inches per revolution. The ideal solution to the problem of increasing tool life in speed and feed ranges below those in which tool oxidation and frictional cratering is the primary mode of failure would seem to be to eliminate the built-up edge region completely. However, a practical solution is to decrease the width of the built-up edge region and correspondingly increase the width of the region where built-up edge is not found thereby providing a much broader speed and feed range in which materials can be machined without the adverse effects of a built-up edge. In terms of FIG. 1, the objective of my invention is to increase the width of the region between lines B—B and C—C and correspondingly to decrease the width of the region between lines A—A and B—B to provide a broad region in which built-up edge may be avoided and to thereby obtain increased tool life in spite of the limitations on speed and feed previously mentioned.

My investigations of surface treatments for carbide tools to attempt to increase useful tool life established two important conclusions concerning the cutting characteristics of carbide cutting tools: First, the self-oxidation of carbide tools during cutting action inhibits chip welding to a large degree. Secondly, if the self-oxidation does not occur rapidly enough during the initial feed, an instantaneous built-up edge will result. At high cutting speeds this instantaneous built-up edge will be removed quickly by the high cutting forces. Also, the high oxidation rates of the tool cutting surfaces at these speeds will prevent further built-up edge from appearing. However, the appearance and removal of the built-up edge at high cutting speeds damages the cutting surfaces of the tools, thereby accelerating cutting edge wear. At lower machining speeds, where lower cutting temperatures and forces are encountered, the instantaneous built-up edge condition may be sustained during the cutting action. In summary, then, I have found that even though self-oxidation of the tools takes place during cutting and this self-oxidation inhibits chip welding to a large degree, the self-oxidation usually occurs too late in the machining operation to prevent instantaneous edge buildup and it is the formation and presence of this instantaneous edge buildup which to a large degree lessens the life of the tool.

I have found that by providing a thin layer of oxide on the order of 0.0002 inch on the surface of the tool, instantaneous edge buildup can be eliminated over a wide range of cutting speeds and feeds. This layer of oxide is formed by heating the tool in an oxidizing environment at a temperature between 750° F. and 1,600° F. for a time sufficient for the desired layer thickness to form.

Reference to the specific examples will further serve to illustrate my method of treating carbide cutting tools.

EXAMPLE I

A tungsten carbide and cobalt binder cutting tool having a composition of 86.50 percent tungsten, 4.38 percent carbon, 2.80 percent tantalum and 6.00 percent cobalt commercially marketed by Kennametal Company, Latrobe, Pa. as Grade K-6 was placed in an electrically heated furnace at a temperature of about 1150° F. exposed to an air oxidizing atmosphere in order to form the desired oxide layer on the surface of the tool. A 15 minute treatment at this temperature was found to produce an oxide layer of about 0.0002 inch on the tool surface.

After treatment, the tool was removed from the furnace, allowed to cool and placed in a turret lathe having longitudinal feed rates of 0.004, 0.006, 0.008, 0.011, 0.015, 0.020, and 0.027 inches per revolution and spindle speed of 40, 54, 72, 92, 124, 168, 218, 296, 398, 504, 684, and 916 revolutions per minute for testing. SAE 1045 steel was chosen as the workpiece and cuts were made at a given feed and speed after which tool wear was evaluated. This process was repeated and evaluations and comparisons between the tools were made to establish the wear regions shown on FIG. 2.

During testing surface finish was also measured and a comparison made between machining with tools exhibiting built-up edge and those without edge buildup. Typical surface finishes resulting from built-up edge tools was on the order of 250 microinches as compared to 125 microinches for tools not exhibiting built-up edge.

EXAMPLE II

Further tool treatments were undertaken to establish a range of temperatures in which the desired oxide layer could be formed without destroying the strength of the tool. It was found that temperatures below 750° F. fail to oxidize the cobalt binder and temperatures above 1,600° F. substantially destroy the strength of the binder at the surface of the tool. At temperatures within this range with appropriate times, i.e., longer times for lower temperatures and shorter times for higher temperatures, the desired layer thickness of about 0.0002 inch was formed.

Referring now to FIG. 2, there is shown a plot similar to that of FIG. 1, but showing the cutting characteristics of a tool treated as described in example I above. As will be seen, there is no change in the position of the line A'—A' indicating the start of built-up edge as compared to an untreated tool. However, there is a substantial decrease in the built-up edge region as may be seen by comparing the width of the region between line A—A and B—B of FIG. 1 with that of line A'—A' and B'—B' of FIG. 2. Correspondingly, there is a substantial increase in the region of no built-up edge effects as may be seen by comparing the region between lines B—B and C—C of FIG. 1 and lines B'—B' and C'—C' of FIG. 2. Thus, by treating the surface of a carbide tool as previously described, the speed and feed range over which built-up edge normally appears is substantially reduced with a corresponding increase in the speed and feed range over which built-up edge does not appear. This drastic change in tool performance is due to the presence of the thin oxide layer on the surface of the tool which prevents instantaneous edge buildup, thus providing a more flexible range of speeds and feeds in which to operate and thus eliminating the primary mode of tool failure in this intermediate machining range with a resulting substantial increase in tool life. Experience has shown that although thicker oxide layers can be formed which do not significantly derogate from the strength of the tool, they do not provide additional effectiveness over that obtained with a layer of about 0.0002 inch.

FIG. 3 provides a direct comparison between the tool performance of the treated and untreated tools. In observing this comparison it may be seen that at a feed of 0.004 inches per revolution, the built-up edge region is decreased from between about 40 to 250 surface feet per minute to about 40 to 120 surface feet per minute, and at a feed of 0.015 inches per revolution from between about 30 to 175 surface feet per minute to about 30 to 90 surface feet per minute. As may be further seen, by practicing the method embodying my invention, a region of no built-up edge between about 120 to 350 surface feet per minute at a feed of 0.004 inches per minute and between about 90 to 275 surface feet per minute at a feed of 0.015 inches per minute is obtained. As a result machining operations which previously were limited to the built-up edge region with accompanying poor tool life and poor surface finish, may now be performed without the formation of a built-up edge thereby obtaining increased tool life and superior surface finishes.

As previously mentioned, the ideal solution to the problem of increasing carbide cutting tool life and cutting characteristics is to eliminate the built-up edge completely. As may be seen in FIG. 2, however, a region of built-up edge still remains even though preoxidation of the tool has eliminated instantaneous edge builtup over the entire machining range. This built-up edge region remains because, first, the original oxide layer eventually wears off and, secondly, the cutting temperatures at these low speeds are such that self-oxidation does not take place to prevent further chip welding. At higher speeds, those above line B'—B', the original oxide layer prevents instantaneous edge buildup so that when it eventually wears off, tool temperatures are high enough for self-oxidation to take place to prevent any chip welding at all. This effect may be seen by comparing lines C—C with lines C'—C' on FIG. 3 which indicate the beginning of cratering failure of the tools. As may be seen, the slope of the preoxidized tool's cratering line (C'—C') and oxidation line (D'—D') is less than that of the untreated tool (C—C) and (D—D). The explanation for this effect is that in the untreated tool temperatures and pressures are such, particularly in the high feed ranges, that a very adherent instantaneous built-up edge forms which when broken off takes a part of the tool with it. However, with a treated tool, instantaneous edge buildup is prevented even in the high feed ranges so that a more stable tool behavior is observed over the entire feed range.

Thus, having described my invention, what is claimed is:

1. A method of improving the useful life and cutting characteristics of a carbide cutting tool having a cobalt binder comprising, heating said tool, before use, in an oxidizing environment to a temperature in the range of 750° to 1,600° F. for a time sufficient for a layer of cobalt oxide having a thickness of at least about 0.0002 inch to form on said tool.

2. A method of improving the useful life and cutting characteristics of a carbide cutting tool having a cobalt binder comprising, heating said tool, before use, in an oxidizing environment to a temperature in the range of 750° to 1,600° F. for a time sufficient for a layer of cobalt oxide having a thickness of about 0.0002 inch to form on said tool.

3. A method of improving the useful life and cutting characteristics of a carbide cutting tool having a cobalt binder comprising, heating said tool, before use, in an oxidizing environment to a temperature in the range of 1,100° to 1,200° F. for a time sufficient for a layer of cobalt oxide having a thickness of at least about 0.0002 inch to form on said tool.

* * * * *